Aug. 12, 1952     F. O. HICKLING     2,606,798
ROLLER BEARING

Filed July 23, 1947     2 SHEETS—SHEET 1

INVENTOR
Frederick Osgood Hickling
BY
ATTORNEYS

Aug. 12, 1952　　　F. O. HICKLING　　　2,606,798
ROLLER BEARING
Filed July 23, 1947　　　　　　　　　2 SHEETS—SHEET 2
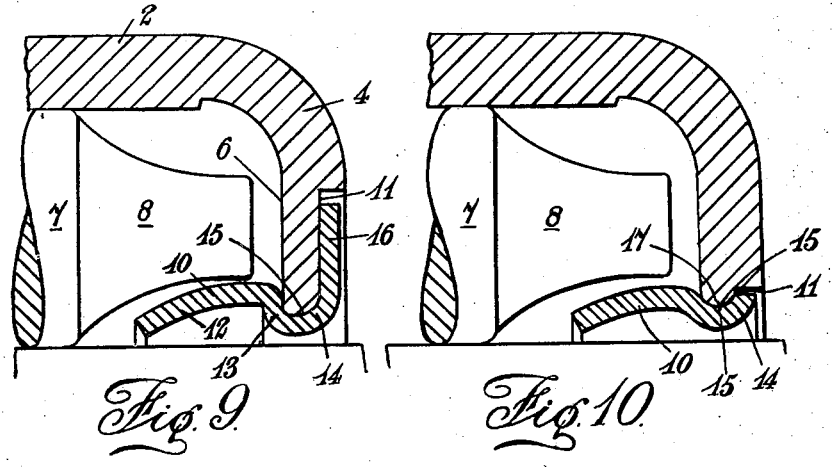
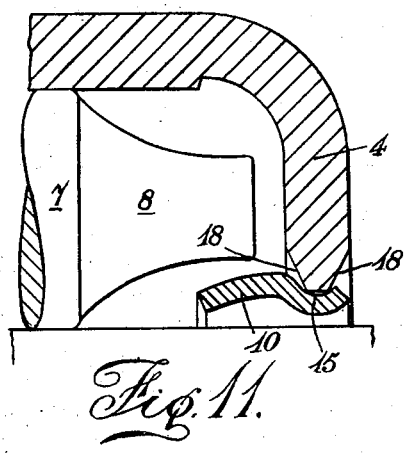
INVENTOR
Frederick Osgood Hickling
BY
ATTORNEYS Patented Aug. 12, 1952

2,606,798

UNITED STATES PATENT OFFICE 2,606,798

ROLLER BEARING

Frederick Osgood Hickling, West Bridgford, England, assignor to Ransome and Marles Bearing Company Limited, Newark-on-Trent, England, a British company Application July 23, 1947, Serial No. 763,014
In Great Britain April 29, 1946

11 Claims. (Cl. 308—213)

This invention relates to roller bearings and more particularly though not necessarily to roller bearings of the type in which needle rollers are employed.

An object of this invention is to provide an improved self contained roller bearing assembly or housing which can be handled as a unit, and so arranged that the rollers can be fitted in or replaced or renewed in an easy and simple manner when renewal is desired.

Heretofore it has been proposed to retain detachably the rollers on a bearing race by means of rings or the like shaped to engage the reduced or shaped ends of the rollers the rings being adapted to provide axial thrust faces and it has also been proposed in a self contained roller bearing assembly unit to provide a one piece tubular raceway having both of its ends bent over to provide laterally extending integral trough shaped retaining means for the reduced ends of the rollers, the said tubular raceway being formed from a metal blank.

According to the present invention the self contained roller bearing assembly unit comprises a one piece tubular raceway element having its ends bent over to provide axial thrust faces for the needles or rollers and means on one or both of the said ends to retain detachably the needles or rollers in the tubular raceway the said means being conveniently in the form of a split or a solid ring member.

The invention also consists in forming one or both of the bent over ends with means to interlock with a detachable ring member to retain detachably the reduced ends of the rollers the said ring member or members being preferably in the form of a split spring ring of metallic, thermo-plastic or other suitable material.

The invention will now be described with reference to the accompanying drawings in which:

Figure 9 is an enlarged detail in cross section of the construction shown in Figure 5.

Figure 10 is an enlarged detail in cross section similar to Figure 9 but showing a modified construction.

Figure 11 is a similar view to Figs. 9 and 10 of a further modified construction.

Figures 4, 5:
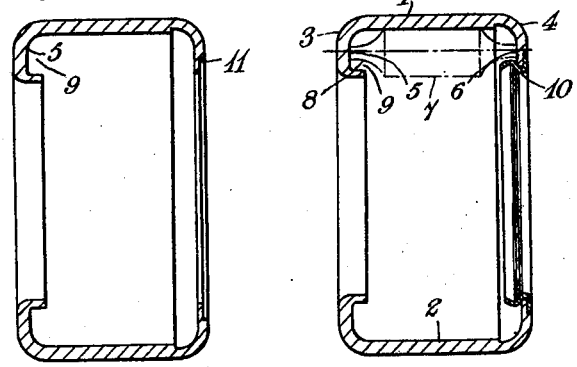
Figure 4 is a similar view showing the face of the turned over end formed with a recess.
Figure 5 is a longitudinal section of the finished tubular raceway with the retaining ring in position to hold the rollers.
Figures 6, 7, 8:
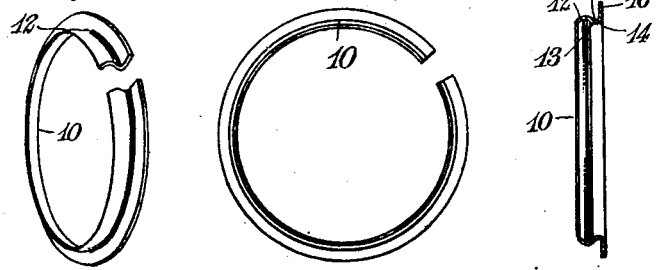
Figure 6 is a perspective view of the roller retaining ring.
Figure 7 is a side view thereof.
Figure 8 is a cross section thereof.

According to one form of this invention a roller bearing assembly which is self-contained so that it can be handled as a housing unit as shown more particularly in Fig. 5 comprises a sheet or tubular metal raceway element which has a cylindrical body portion 2 and integrally formed extensions 3 and 4 which are bent over at each end to provide axial thrust faces 5 and 6 respectively for the needles or rollers 7 mounted in the body portion. The needles or rollers 7 are reduced in diameter at their ends and shaped in any convenient or known manner as shown at 8 whereby they may be retained in the bearing. The end extension 3 is bent over to a trough shape indicated at 9 in Figs. 1 to 5 to hold one end of the rollers 7. The other end extension 4 is formed with means for co-operation with a detachable roller retaining ring 10 shown in Figs. 6 to 8 which is adapted to retain the other end of the rollers. This latter end extension 4 is bent inwardly substantially at right angles to the body portion, when an internal raceway is formed in the cylindrical body 2, and extends inwardly beyond the axis of the rollers.

Figures 1, 2, 3:
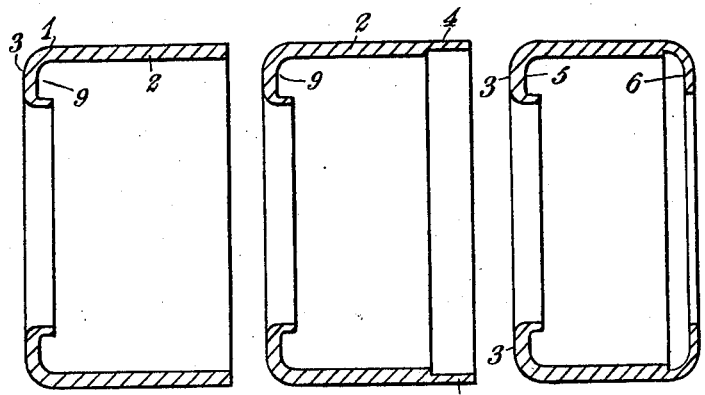
Figure 1 is a longitudinal section of a partially finished outer member for one form of an outer tubular raceway.
Figure 2 is a similar view showing the member bored or swaged at its open end.
Figure 3 shows the open end turned over.

In the preferred method of manufacture a tubular pressing or member is first formed as shown in Fig. 1 with the cylindrical body portion 2 and the extension 3 formed to provide the trough 9. The open end of this pressing is then bored or swaged interiorly to the shape shown in Fig. 2 and this end 4 is turned over as shown in Fig. 3 to provide the axial thrust face 6. Thus the thickness of this end 4 is reduced to facilitate bending over in any convenient manner before the rollers are mounted in the bearing and a recess 11 is formed on the face of the open end as shown in Fig. 4. This recess 11 may be formed by machining or formed by a suitable press or a swaging operation. The distance between the bent over ends 3 and 4 is preferably slightly greater than the length of the rollers 7 to permit of small axial movement between the thrust faces 5 and 6 formed by the said ends 3 and 4 respectively. The detachable roller retaining ring 10 is preferably in the nature of a split ring of spring steel or other resilient material so that it can be positioned readily in the end of the bearing and held by the co-operating means. The co-operating means comprises the before described shaped body extension 4 and the shaped portions on the ring. In one form as shown more particularly in Figs. 6 to 8 the split ring 10 is shaped to form a substantially cylindrical or conical portion 12 adapted to retain one end of the rollers 7 and inwardly and outwardly bent portions 13 and 14 respectively to provide a circumferential groove 15 to co-operate with the body extension 4 of the housing. The outwardly bent portion 14 provides a flange 16 which is adapted to lie in the outer circumferential groove or recess 11 as shown more particularly in Fig. 9. Conveniently the retaining ring 10 is of approximately half the thickness of the reduced extension 4 so that the flange 16 on the ring 10 will seat in the circumferential groove or recess 11 on the outer end portion of the extension 4 when the ring 10 is sprung into position as shown in Figs. 5 and 9. It will be understood that the cylindrical portion of the ring is preferably so shaped as to conform with the shaped ends of the rollers.

In another form as shown in Fig. 10 the circumferenial groove 15 of the retaining ring 10 is of substantially semicircular shape in section to co-operate with a nosing 17 formed on the extension 4, the said nosing 17 being of substantially semi-circular shape and approximately half the thickness of the reduced extension 4 so as to provide the outer groove or recess 11 to receive the outwardly curved portion 14 of the groove 15 formed in the ring. This form of retaining ring may be split or alternatively of solid spring steel or other material so that it can be forced into its retaining position.

In a further form as shown in Fig. 11 the cooperating edge of the extension 4 may be tapered by chamfering the edges as shown at 18 so as to co-operate with the outer circumferential groove 15 formed on the ring 10 of solid or split form.

It is preferable to provide the detachable ring 10 at only one end of the body portion of the housing as previously described so that the housing can be formed from a sheet metal blank by means of a drawing and forming process in the known manner or manufactured from tubular material as previously described but obviously detachable rings 10 for retaining the reduced ends 8 of the rollers 7 could be fitted at both ends, the bent-over ends 3 and 4 being suitably formed for this purpose. Further the constructions described could be employed for inner or outer raceways. In all cases the roller retaining means are so arranged as not to project beyond the main diameter of the rollers and are preferably so arranged as not to extend beyond the length of the roller housing.

What I claim is:

1. A self-contained roller bearing comprising a one piece sheet metal tubular raceway having integral radially extending lips at its opposite ends, a plurality of axially extending rollers arranged between said lips which provide axial thrust faces for the ends of said rollers, and a removable retaining ring normally mounted on one of said lips for normally retaining said rollers in position in said raceway but being removable to permit removal of said rollers, said ring being split and being formed of resilient spring material, means for removably attaching said ring to said lip, said means comprising interfitting portions carried by the lip and the ring for precluding axial movement of the ring in both directions relative to the lip, said interfitting portions comprising portions carried by the ring which engage opposite sides of the edge of the lip, said ring cooperating with said lip to form a trough for receiving and for retaining the adjacent ends of said rollers.

2. A self-contained roller bearing according to claim 1 wherein said retaining ring is associated with one of said lips only and the other lip is shaped to provide a trough for receiving and retaining the adjacent ends of said rollers.

3. A self-contained roller bearing according to claim 1 wherein said lips extend inwardly and the rollers are arranged around the interior of said tubular raceway and disposed between said lips and wherein said split ring is of spring steel and is inserted within the lip to expand outwardly into association therewith.

4. A self-contained roller bearing according to claim 1 wherein said lips extend inwardly and the rollers are arranged around the interior of said tubular raceway and disposed between said lips and wherein the ring is provided with a portion disposed within and engaging the inner-edge of said lip, said interfitting portions of the lip and ring being formed in said portion of the ring and said inner edge of the lip, said ring being provided with an axially extending portion which overlaps the ends of the adjacent rollers to form said trough.

5. A self-contained roller bearing according to claim 4 wherein the ends of the rollers are conically shaped and said axially extending portion of said ring is substantially complementally shaped to cooperate therewith.

6. A self-contained roller bearing comprising a one piece sheet metal tubular raceway having integral radially extending lips at its opposite ends, a plurality of axially extending rollers arranged between said lips which provide axial thrust faces for the ends of said rollers, said ends of said rollers being conically shaped, and a removable retaining ring normally mounted on one of said lips for normally retaining said rollers in position in said raceway but being removable to permit removal of said rollers, said ring cooperating with said lip to form a trough for receiving and retaining the adjacent ends of said rollers, means for removably attaching said ring to said lip, said means comprising a portion on said ring disposed within and engaging the inner edge of said lip, said portion of the ring disposed within said lip having a circumferential groove formed in its outer surface and said inner edge of the lip having an annular inwardly directed shoulder extending into said groove so as to preclude axial movement of the ring relative to the lip, said ring being provided with an axially extending portion which overlaps the ends of the adjacent rollers, said axially extending portion being of a shape substantially complemental to said conically shaped ends of the rollers for cooperating therewith.

7. A self-contained roller bearing according to claim 6 wherein said groove is of semi-circular shape and wherein said shoulder is complemental to said groove.

8. A self-contained roller bearing according to claim 6 wherein the portion of the ring disposed within said lip is provided with a circumferential extension and said lip is provided with a recess in its outer face for receiving said extension so that said extension does not project beyond said outer face of the lip.

9. A self-contained roller bearing according to claim 6 wherein said lips extend inwardly and the rollers are arranged around the interior of said tubular raceway and disposed between said lips and wherein the retaining ring is a split ring of spring steel and is inserted within the lip to expand outwardly into association therewith.

10. A self-contained roller bearing according to claim 1 wherein said lips extend inwardly and the rollers are arranged around the interior of said tubular raceway and are disposed between said lips and wherein the split ring expands outwardly and is provided with a portion disposed within and engaging the edge of the lip, said interfitting portions including a circumferential groove of semi-circular cross-section at the outer extremity of said ring and an annular inwardly directed shoulder on said lip with a tapered edge which fits into said groove.

11. A roller bearing compriisng a tubular raceway having integral radially extending lips at its opposite ends, a plurality of axially extending rollers arranged between said lips which provide axial thrust faces for the ends of said rollers, and a removable retaining ring normally mounted on one of said lips for normally retaining said rollers in position in said raceway but being removable to permit removal of said rollers, said ring being split and being formed of resilient spring material, means for removably attaching said ring to said lip, said means comprising interfitting portions carried by the lip and the ring for precluding axial movement of the ring in both directions relative to the lip, said interfitting portions comprising a portion carried by the ring which engages opposite sides of the edge of the lip, said ring cooperating with said lip to form a trough for receiving and for retaining the adjacent ends of said rollers.

FREDERICK OSGOOD HICKLING.

REFERENCES CITED

The following references are of record in the file of this patent:

UNITED STATES PATENTS

| Number | Name | Date |
| --- | --- | --- |
| 1,143,479 | Abbott | June 15, 1915 |
| 1,231,752 | Laycock | July 3, 1917 |
| 2,038,475 | Brown | Apr. 21, 1936 |
| 2,094,252 | Young | Sept. 28, 1937 |

FOREIGN PATENTS

| Number | Country | Date |
| --- | --- | --- |
| 396,511 | Great Britain | Aug. 10, 1933 |
| 844,290 | France | July 21, 1939 |